United States Patent [19]

Bäbler

[11] 4,404,386

[45] Sep. 13, 1983

[54] PROCESS FOR THE PREPARATION OF OPAQUE PERYLENETETRACARBOXYLIC ACID BIS-(3,5-DIMETHYLPHENYLIMIDE)

[75] Inventor: Fridolin Bäbler, Allschwil, Switzerland

[73] Assignee: Ciba-Geigy Corporation, Ardsley, N.Y.

[21] Appl. No.: 272,865

[22] Filed: Jun. 12, 1981

[30] Foreign Application Priority Data

Jun. 23, 1980 [CH] Switzerland ......................... 4805/80

[51] Int. Cl.$^3$ ..................... C07D 487/06; D06P 3/79; D06P 3/62; D06P 3/26
[52] U.S. Cl. ..................................... 546/37; 106/204; 8/568; 524/90
[58] Field of Search .......................................... 546/37

[56] References Cited

U.S. PATENT DOCUMENTS

| | | | |
|---|---|---|---|
| 4,230,858 | 10/1980 | Gall | 546/37 |
| 4,240,793 | 12/1980 | Graser | 546/37 |
| 4,262,851 | 4/1981 | Graser | 546/37 |
| 4,298,526 | 11/1981 | Sappok et al. | 106/288 Q |

FOREIGN PATENT DOCUMENTS

| | | | |
|---|---|---|---|
| 1094897 | 12/1960 | Fed. Rep. of Germany | |
| 1202302 | 8/1970 | United Kingdom | 546/37 |

OTHER PUBLICATIONS

CA, 84, 166251s (1976).
CA, 55, 22849b (1961).
Farbwerke, Chem. Abs. 55, 2136c (1960).
Graser et al., Ann. Chem. 1980, 1994–2011 (1980).
Babler, Chem. Abs. 94, 210300q (1981).

*Primary Examiner*—Mark L. Berch
*Attorney, Agent, or Firm*—Luther A. R. Hall

[57] ABSTRACT

Process for the preparation of opaque perylenetetracarboxylic acid bis-(3,5-dimethylphenylimide), which comprises heating the α-modification of perylenetetracarboxylic acid bis-(3,5-dimethylphenylimide) in at least one aliphatic monocarboxylic acid. Use as a pigment for plastic compositions, printing inks, fibres and paints.

5 Claims, No Drawings

PROCESS FOR THE PREPARATION OF OPAQUE PERYLENETETRACARBOXYLIC ACID BIS-(3,5-DIMETHYLPHENYLIMIDE)

German Patent Specification No. 1,067,157 describes the preparation of perylenetetracarboxylic acid bis-(3,5-dimethylphenylimide) by condensing perylenetetracarboxylic dianhydride with 3,5-dimethylaniline in the presence of concentrated hydrochloric acid. The pigment obtainable by this process is the yellowish red $\alpha$-modification of the compound, which has coarse, highly acicular crystals and is in the transparent form after grinding.

Japanese Offenlegungsschrift No. 78/106,745 describes the after-treatment of perylenetetracarboxylic acid bis-(3,5-dimethylphenylimide) with an inert organic solvent, under the action of heat, in order to obtain a pigment which gives distortion-free colouring of polyolefins, for example polyethylene, in the melt.

It has now been found that a pure opaque form of the $\alpha$-modification of perylenetetracarboxylic acid bis-(3,5-dimethylphenylimide) is obtained if the $\alpha$-modification of perylenetetracarboxylic acid bis-(3,5-dimethylphenylimide) is heated in at least one aliphatic monocarboxylic acid. Suitable aliphatic monocarboxylic acids are especially those having 1-3 C atoms, i.e. preferably formic acid, acetic acid and propionic acid, and also mono- and di-chloroacetic acid, butyric acid, valeric acid, 2-methylpentanoic acid and 2-ethylcaproic acid. Heating with trifluoroacetic acid is not suitable since the bluish gamma-modification is formed in that case.

The treatment is advantageously carried out by a procedure in which the known $\alpha$-modification of the pigment, preferably in a very fine crystalline form, such as is obtained, for example, by thorough grinding of the coarse crystalline form obtained according to German Patent Specification No. 1,067,157, is heated to temperatures between 100° and 200° C., preferably to 100°–150° C., whilst stirring in the aliphatic monocarboxylic acid, if appropriate under pressure. 5–30 parts by weight of the aliphatic carboxylic acid are preferably used per 1 part by weight of pigment. The duration of the treatment depends on the aliphatic carboxylic acid used and is generally 1–30 hours, preferably 10 to 24 hours. The presence of small amounts of water can be tolerated, although anhydrous treatment is preferred.

After the treatment, the pigment present in granular form is advantageously isolated by filtering the pigment suspension and drying the press-cake washed with the corresponding aliphatic carboxylic acid, water or a polar organic solvent, for example alcohol.

Surprisingly, compared with the product obtained according to Japanese Offenlegungsschrift No. 78/106,745, the after-treatment according to the invention, with aliphatic carboxylic acids, produces a pigment which, in addition to the advantage of the distortion-free colouring of polyolefins, is also distinguished by further advantageous properties, for example good dispersibility, good rheological properties, high gloss, excellent heat resistance and weathering fastness and, very particularly, a high hiding power. When applied in full shade, the pigment gives rich hues with a high diffusion factor, on account of the excellent hiding power, and can therefore be used as an organic alternative pigment for the Cd Red pigments. It is surprising that, compared with the high-boiling aromatic solvents mentioned in Japanese Offenlegungsschrift No. 78/106,745, a pigment with such good properties is obtained even on warming at the reflux temperature in simple aliphatic carboxylic acids.

Compared with the product obtained synthetically according to German Patent Specification No. 1,067,157, which has a coarse crystalline, acicular structure, the pigment obtained according to the invention gives substantially more intense colorations, with equal dispersibility at low as at high shear strength and without dichroism.

The novel opaque form of the $\alpha$-modification is suitable for pigmenting high-molecular organic material, thermoplastics and thermosetting plastics, such as cellulose ethers and cellulose esters, for example ethylcellulose, nitrocellulose, cellulose acetate and cellulose butyrate, natural resins or synthetic resins, such as polymerisation resins or condensation resins, for example aminoplasts, especially urea/formaldehyde and melamine/-formaldehyde resins, alkyd resins, phenoplasts, polycarbonates, polyolefins, such as polystyrene, polyethylene, polypropylene, polyvinyl chloride, polyacrylonitrile and polyacrylic acid esters, polyamides, polyurethanes or polyesters, rubber, casein, silicones and silicone resins, individually or in mixtures.

The high-molecular compounds mentioned can be in the form of plastic compositions, or melts, or in the form of spinning solutions, lacquers paints or printing inks. Depending on the intended use, it proves advantageous to use the novel form of pigment as a toner or in the form of preparations.

In the following examples, parts and percentages are by weight, unless stated otherwise, and the temperatures are given in degrees centigrade.

EXAMPLE 1

In a stirred vessel, 30 parts of perylenetetracarboxylic acid bis-(3,5-dimethylphenylimide), in a finely ground form, are stirred in 600 parts by volume of glacial acetic acid for 24 hours at the reflux temperature. The red pigment suspension, which has become distinctly more viscous towards the end of the reflux time, is filtered at 70° to 80° and the press-cake is washed with 300 parts by volume of glacial acetic acid and then with water, dried in a vacuum drying cabinet at 70° to 80° and powdered. This gives 29 parts of perylenetetracarboxylic acid bis-(3,5-dimethylphenylimide) pigment, which, when used to colour plasticised PVC milled sheets, gives clear, intense, opaque colorations with excellent fastness to light, weathering fastness and heat resistance. The pigment exhibits a very good dispersibility, virtually equal dispersibility at low as at high shear strength (cold-milling), and no dichroism.

EXAMPLE 2

The procedure described in Example 1 is repeated, except that 600 parts by volume of formic acid are used in place of 600 parts by volume of glacial acetic acid, affording a perylenetetracarboxylic acid bis-(3,5-dimethylphenylimide) pigment with a good hiding power and with equally good properties.

EXAMPLE 3

The procedure described in Example 1 is repeated, except that 600 parts by volume of propionic acid are used in place of 600 parts by volume of glacial acetic acid and the mixture is stirred at the reflux temperature for only 20 hours instead of 24 hours, affording an opaque perylenetetracarboxylic acid bis-(3,5-dimethylphenylimide) pigment with equally good properties.

EXAMPLE 4

In a stirred vessel, 20 parts of perylenetetracarboxylic acid bis-(3,5-dimethylphenylimide), advantageously in a finely ground form, are stirred into 400 parts of monochloroacetic acid, molten at 80°, and the mixture is stirred for 20 hours at 140°–150°. The red pigment suspension is cooled to 75° and diluted with 100 parts of isopropanol. The pigment suspension is filtered at 60° to 70°, the press-cake is washed thoroughly with isopropanol and dried at 70° to 80° in vacuo, and the dry material is powdered. This gives 19 parts of a perylenetetracarboxylic acid bis-(3,5-dimethylphenylimide) pigment, which, when used to colour plasticised PVC milled sheets, gives clear, intense colorations with a very good hiding power and with excellent fastness to light and heat resistance. The pigment exhibits a very good dispersibility, no dichroism and virtually equal dispersibility at low as at high shear strength (cold-milling).

EXAMPLE 5

A mixture of 1.0 part of the opaque perylene pigment obtained according to Examples 1 to 4, 1.0 part of antioxidant (IRGANOX 1010 ® from CIBA-GEIGY AG) and 1,000 parts of high-density polyethylene granules (Vestolen A 60-16 ® from Hüls) is premixed for 15 minutes in a glass flask on a roller stand. The mixture is then extruded in two passes on a single-screw extruder, the granules thus obtained are moulded on an Allround Aarburg 200 injection-moulding machine, at 220°, to form plaques, and the plaques are subsequently compression-moulded for 5 minutes at 180°. The moulded plaques are distortion-free and have intense, rich red hues with excellent fastness properties.

EXAMPLE 6

2.0 parts of a 50% pigment preparation consisting of 1.0 part of the opaque perylene pigment obtained according to Examples 1 to 4 and 1.0 part of Mg behenate are used in place of 1.0 part of the pure toner pigment, and the procedure is otherwise as described in Example 4, affording rich red moulded plaques with similarly good properties.

EXAMPLE 7

1,000 parts of polypropylene granules for spinning fibres and 20 parts of a 50% pigment preparation consisting of 10 parts of the opaque perylene pigment obtained according to Examples 1 to 4 and 10 parts of Mg behenate are thoroughly mixed in a mixing drum. The granules treated in this way are melt-spun at 280° to 285°. This gives deep red fibres with very good fastness to light and textile fastness properties.

EXAMPLE 8

For colouring PVC, a mixture of 65 parts of stabilised PVC, 35 parts of dioctyl phthalate and 0.2 part of the opaque perylene pigment obtained according to Examples 1 to 4 is prepared and worked between two rolls of a mill at about 150° for 5 minutes. The plasticised PVC sheet obtained in this way has a red coloration with a good hiding power and excellent fastness to light.

EXAMPLE 9

A mixture of 130 parts of steatite spheres with a diameter of 8 mm, 47.5 parts of alkyd-melamine stoving lacquer, consisting of 60 parts of Beckosol 27-320 ®, 60% in xylene (Reichhold Chemie AG), 36 parts of Super-Beckamin 13-501 ®, 50% in a 1:1 mixture of xylene and butanol (Reichhold Chemie AG), 2 parts of xylene and 2 parts of ethylene glycol monomethyl ether, and 2.5 parts of the opaque perylene pigment obtained according to Examples 1 to 4 is dispersed in a 200 ml glass flask with a twist-off stopper, for 120 hours on a roller stand. After separating off the steatite sphere, 2.4 parts of the full-shade mixture dispersed in this way, 6.0 parts of titanium dioxide (Kronos RN 59 ® from Kronos Titan GmbH) and 24.0 parts of the above alkyd-melamine stoving lacquer are mixed, sprayed onto aluminium sheets and then stoved for 30 minutes at 130°. This gives intense red colorations with excellent fastness properties.

What is claimed is:

1. A process for the preparation of opaque perylenetetracarboxylic acid bis-(3,5-dimethylphenylimide), which comprises heating the alpha-modification of perylenetetracarboxylic acid bis-(3,5-dimethylphenylimide) in at least one aliphatic monocarboxylic acid selected from the group consisting of formic acid, acetic acid, propionic acid and monochloroacetic acid.

2. A process according to claim 1, which comprises starting from a finely ground α-modification of perylenetetracarboxylic acid bis-(3,5-dimethylphenylimide).

3. A process according to claim 1, which comprises using formic acid, acetic acid or propionic acid as the aliphatic monocarboxylic acid.

4. A process according to claim 1, which comprises using 10–30 parts of the aliphatic monocarboxylic acid to 1 part of pigment.

5. A process according to claim 1, which comprises heating to temperatures between 100° and 150°.

* * * * *